United States Patent [19]

Dolman

[11] 4,302,993
[45] Dec. 1, 1981

[54] MULTI-SPINDLE LATHES

[75] Inventor: Roy S. Dolman, Polesworth, Nr. Tamworth, England

[73] Assignee: White-BSA Tools Ltd., Birmingham, England

[21] Appl. No.: 41,519

[22] Filed: May 22, 1979

[30] Foreign Application Priority Data

May 24, 1978 [GB] United Kingdom ............... 22137/78

[51] Int. Cl.³ .................. B23B 19/00; B23B 9/00
[52] U.S. Cl. ........................................ 82/29 R; 82/3
[58] Field of Search .................. 82/3, 28 R, 29 R; 29/37 R

[56] References Cited

U.S. PATENT DOCUMENTS 3,722,048 3/1973 Schubert ............................ 82/3
3,744,354 7/1973 Gilbert ............................... 82/3
4,048,880 9/1977 Link .................................. 82/3

Primary Examiner—Leonidas Vlachos

[57] ABSTRACT

A multi-spindle machine tool comprises a frame mounting an indexable work spindle carrier which carries a plurality of rotatably mounted work spindles, and a workpiece gripper mounted on each spindle and including an actuating element movable axially of the associated spindle to open and close the workpiece gripper. A ring surrounds all of the spindles and is angularly movable about an axis coincident with the axis of the carrier, and a cam surface on said ring co-acts with said actuating elements whereby the grippers can be opened and closed by a sequence of operations including angular movement of the ring and indexing of the spindle carrier.

7 Claims, 2 Drawing Figures

MULTI-SPINDLE LATHES

This invention relates to a multi-spindle machine tool and has as an object to provide such a machine in a convenient form.

A multi-spindle machine tool according to the invention comprises a frame, an indexable work spindle carrier mounted on the frame, a plurality of work spindles rotatably mounted on the carrier, workpiece gripping means on each spindle, each workpiece gripping means including an actuating element movable axially of the associated spindle to open and close the workpiece gripping means, a ring surrounding all of the spindles and angularly movable about an axis coincident with the axis of the carrier, and a cam surface on said ring coacting with said actuating elements, such that the workpiece gripping means can be opened and by a sequence of operations including angular movement of the ring and indexing of the spindle carrier.

Figure 1:
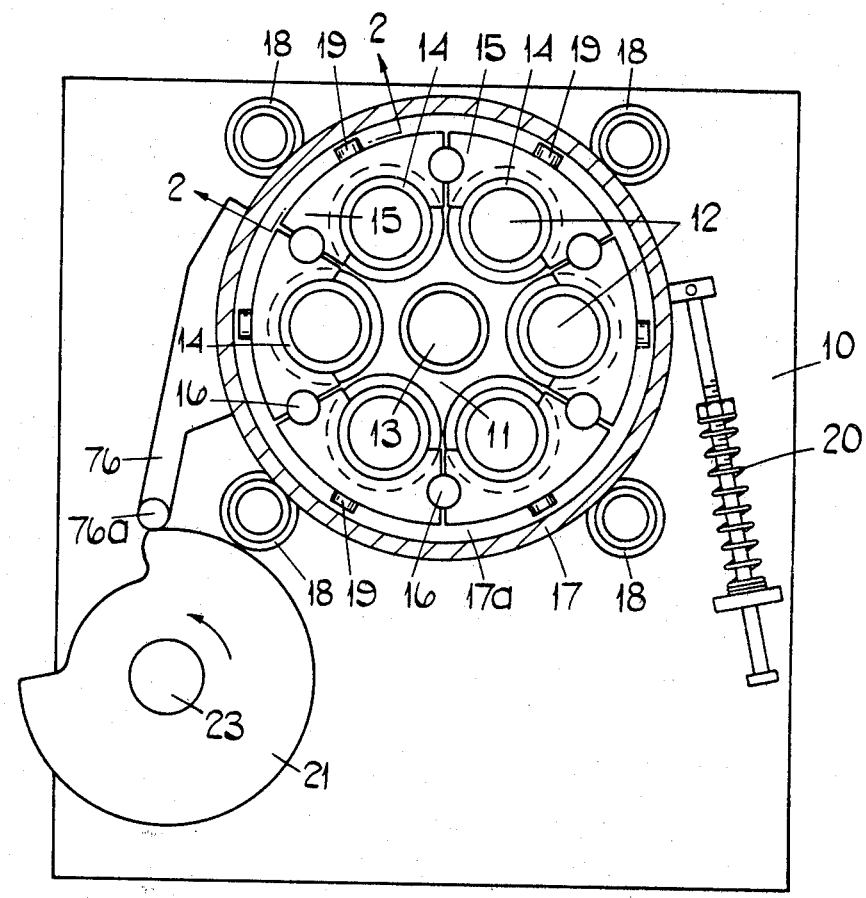
Figure 2:
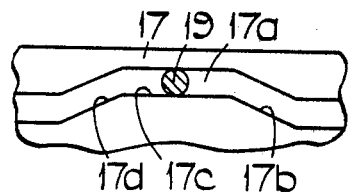

An example of the invention is illustrated diagrammatically in the accompanying drawing, in which:

FIG. 1 is a diagrammatic sectional view through a multi-spindle machine according to the invention, and FIG. 2 is a fragmentary sectional view on the line 2—2 in FIG. 1.

The illustrated multi-spindle machine tool comprises a frame 10 on which there is mounted a work spindle carrier 11. Six equi-spaced parallel work spindles 12 are rotatably mounted on this carrier, and are driven in use from a main drive shaft 13 by a mechanism which is not shown but which is preferably of the type disclosed in our corresponding U.S. Application Ser. No. 41,518 filed simultaneously herewith based on British Application No. 22135/78. Further mechanisms are provided for indexing and locking the spindle carrier 11 although these form no part of the present invention and will not be further described.

Each spindle, as is usual, has collet-type workpiece gripping means actuable by a respective collar 14 which is axially movable along the spindle. Each collar 14 has an external groove therein, and a respective yoke 15 is engaged with the groove. The yokes 15 are axially slidably mounted between axially projecting guide rods 16 on the carrier 11.

For axially displacing the yokes 15 there is provided a cam ring 17 mounted on the frame 10 by means of rollers 18 for rotation about an axis coincident with that of the carrier 11, the cam ring being restrained against axial displacement. The cam ring 17 has an internal groove 17a into which respective rollers 19 on the yokes 15 project. This groove 17a defines a cam track whereby axial displacement of the yokes 15 is obtained upon relative angular movement between the cam ring 17 and the carrier 11. The groove 17a is straight over most of its length, but deviates in the region shown in FIG. 2 to form a first ramp portion 17b, a portion 17c offset from the straight portion of the groove, and a second ramp portion 17d.

It will be appreciated that more than one region like that shown in FIG. 2 may be incorporated in the cam ring 17 if desired and, moreover, such regions may be associated with any of the spindle stations.

A bracket 76 is fixed to the cam ring 17 and carries a roller 76a thereon which engages a rotatable cam 21 on a cam shaft 23. A spring 20 acts on the cam ring 17 so as to bias the roller 76a into engagement with the cam 21.

The machine described above operates as follows. At the end of a machining cycle, as tool slides of the machine are withdrawn from the workpiece, the carrier 11 is unlocked and indexed through 60°. Initially the cam ring 17 is stationary so that the roller 19 on one of the yokes 15 moves over the ramp portion 17b, thereby releasing the associated gripping means. The cam ring 17 is then set in motion by the cam 21 so that the roller 19 remains on the portion 17c, thereby maintaining the gripping means open. The carrier 11 is arrested when it reaches its new position and the cam 21 causes the ring 17 to be arrested also. Finally, when the time comes for the gripping means to be closed again, the ring 17 is returned by the action of the cam 21 and the spring 20 to its original position so that the roller 19 passes over the ramp 17d and the associated yoke 15 is returned to its original position.

It will be noted that the above arrangement enables the gripping means to be opened at an early stage in the "non-working" part of the cycle of the machine, so that loading of a new workpiece or feeding of bar stock, as the case may be, can be accomplished without delay. Conventionally the opening of the gripping means does not commence until indexing is complete. In this case the work loading or bar feeding stage cannot overlap any other stages and this would result in an increased work cycle time.

The fixed bracket 76 may be replaced by an arm pivoted on the ring 17 and lockable in alternative positions, in one of which the roller 76a engages the cam 21 and in the other of which the arm extends generally radially for use as a handle for turning the ring.

In an alternative construction (not shown), the return spring 20 is replaced by a bracket, roller and cam arrangement similar to the bracket 76, roller 76a and cam 21 described above, the two cams then co-operating to move the cam ring 17 angularly in either direction as desired at the appropriate time. The use of a return spring is, however, preferred.

I claim:

1. A multi-spindle machine tool comprising a frame, a spindle carrier mounted on said frame, means for indexing said spindle carrier relative to said frame about an indexing axis, a plurality of work spindles rotatably mounted on said spindle carrier, each said work spindle being provided with workpiece-gripping means which can be opened and closed, a plurality of actuating elements each of which is mechanically connected to a respective one of said workpiece-gripping means and which is movable along the respective work spindle to open and close said respective workpiece-gripping means, a cam ring surrounding all of said work spindles and means for moving said cam ring angularly about said indexing axis, said cam ring having a cam surface which co-acts mechanically with said actuating elements such that said workpiece-gripping means can be opened and closed by effecting relative angular movement between said cam ring and said spindle carrier.

2. A multi-spindle machine tool as claimed in claim 1, wherein the cam surface is formed by a groove in the ring within which a part of each actuating element engages, the groove being generally straight but having a least one portion which is offset from the remainder of the groove and which is connected thereto by way of ramp portions.

3. A multi-spindle tool as claimed in claim 1 or 2, wherein an actuating member is movable angularly with the ring and engages a rotatable cam, such that rotation of the cam causes angular movement of the carrier about its axis.

4. A multi-spindle machine tool as claimed in claim 3, wherein a return spring biasses the ring angularly about its axis so as to maintain the actuating member in engagement with the rotatable cam.

5. A multi-spindle machine tool as claimed in claim 3, wherein a further actuating member is movable angularly with the ring and engages a further rotatable cam, the two rotatable cams co-operating to move the ring angularly in one direction or the other.

6. A multi-spindle machine tool as claimed in claim 3, 4 or 5 wherein the or each actuating member is pivoted to the ring so as to be movable between a first position in which it engages the respective rotatable cam and a second position in which it it extends generally radially of the carrier for use as a handle.

7. A multi-spindle machine tool as claimed in claim 1, wherein the cam surface on the ring is so arranged that, at the end of a machining cycle in use, the gripping means can be opened by indexing the carrier while holding the ring stationary, the ring can be moved angularly with the carrier, and the gripping means can be closed by returning the ring angularly to its starting position.

* * * * *